US008128102B1

United States Patent
Brown

(10) Patent No.: US 8,128,102 B1
(45) Date of Patent: Mar. 6, 2012

(54) KNEELING/SLEDDING SNOW BOARD APPARATUS

(75) Inventor: Chris T. Brown, Austin, TX (US)

(73) Assignee: Stardust Boardwerks, LLC, Austin, TX (US)

( * ) Notice: Subject to any disclaimer, the term of this patent is extended or adjusted under 35 U.S.C. 154(b) by 460 days.

(21) Appl. No.: 12/537,331

(22) Filed: Aug. 7, 2009

Related U.S. Application Data

(60) Provisional application No. 61/181,690, filed on May 28, 2009, provisional application No. 61/088,150, filed on Aug. 12, 2008.

(51) Int. Cl.
*B62B 17/00* (2006.01)
(52) U.S. Cl. .............. 280/18.1; 280/27; 280/18; 441/72
(58) Field of Classification Search ............... 280/15, 280/16, 17, 18, 18.1, 19, 19.1, 21.1, 22, 22.1, 280/27, 23.1; 441/65, 72
See application file for complete search history.

(56) References Cited

U.S. PATENT DOCUMENTS

| 3,948,536 | A | * | 4/1976 | Konrad | 280/18 |
| 4,028,761 | A | * | 6/1977 | Taylor | 441/65 |
| 4,669,992 | A | * | 6/1987 | Morris | 441/65 |
| 5,253,885 | A | * | 10/1993 | McCracken et al. | 280/20 |
| 5,941,540 | A | * | 8/1999 | O'Haire | 280/18 |
| 6,729,651 | B2 | * | 5/2004 | Pace | 280/845 |
| 7,887,066 | B2 | * | 2/2011 | Knarvik | 280/18 |
| 2004/0119252 | A1 | * | 6/2004 | Sellers | 280/18 |
| 2006/0027982 | A1 | * | 2/2006 | Smith et al. | 280/27 |
| 2007/0096411 | A1 | * | 5/2007 | Rempe et al. | 280/32.5 |

* cited by examiner

*Primary Examiner* — John R Olszewski
(74) *Attorney, Agent, or Firm* — Stephen J. Stark; Miller & Martin PLLC

(57) ABSTRACT

A kneeling/sledding snow board apparatus provides a retention device connecting to a gliding board. The retention device has a tray mounted to a mounting device connected possibly with snow board binding connections. The tray receives a knee pad having a seat extension extending up from a mid portion of the knee pad. Cutouts allow the rider's legs to extend therethrough. A lap and knee straps restrain the legs of a rider along with vee straps. The tray preferably tapers upwardly and outwardly from a base to provide somewhat of a U-shaped cross section which may assist in deflecting snow and providing increased comfort to a rider.

10 Claims, 6 Drawing Sheets

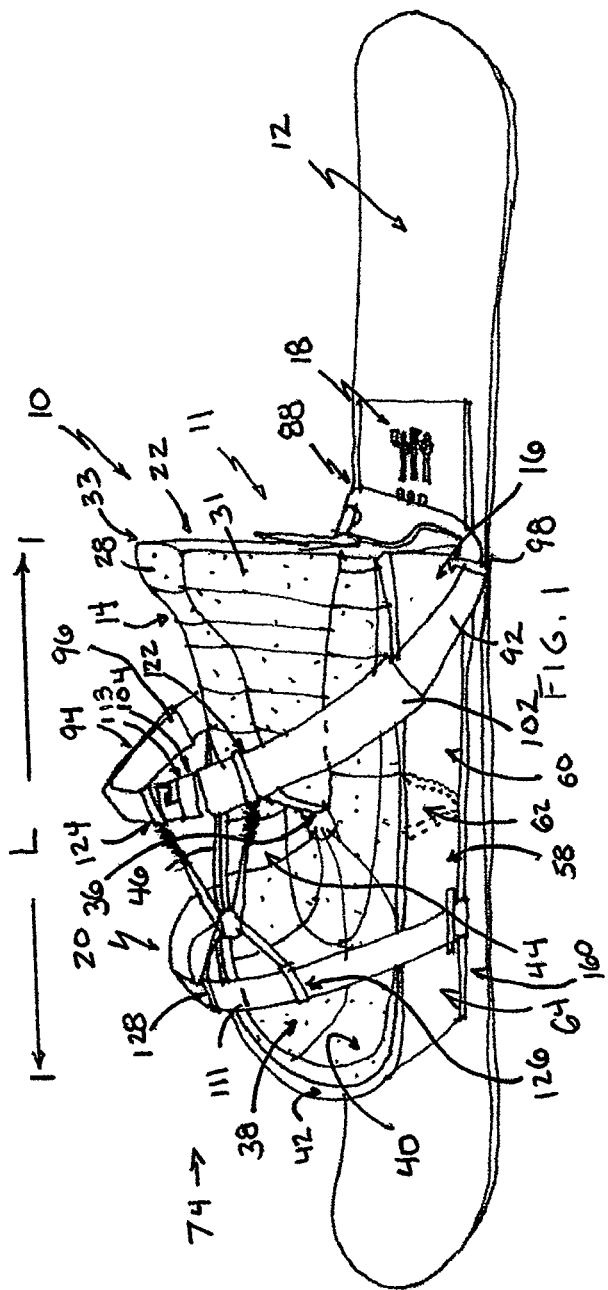
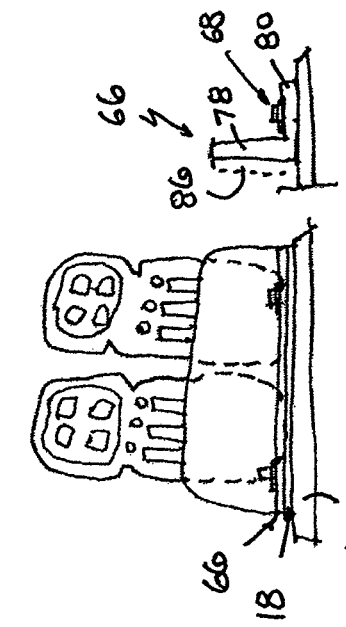
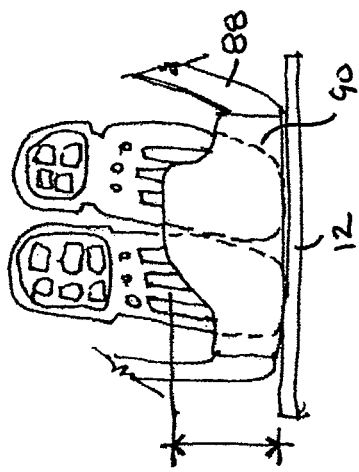
FIG. 1
FIG 6A
FIG 6B
FIG 6C

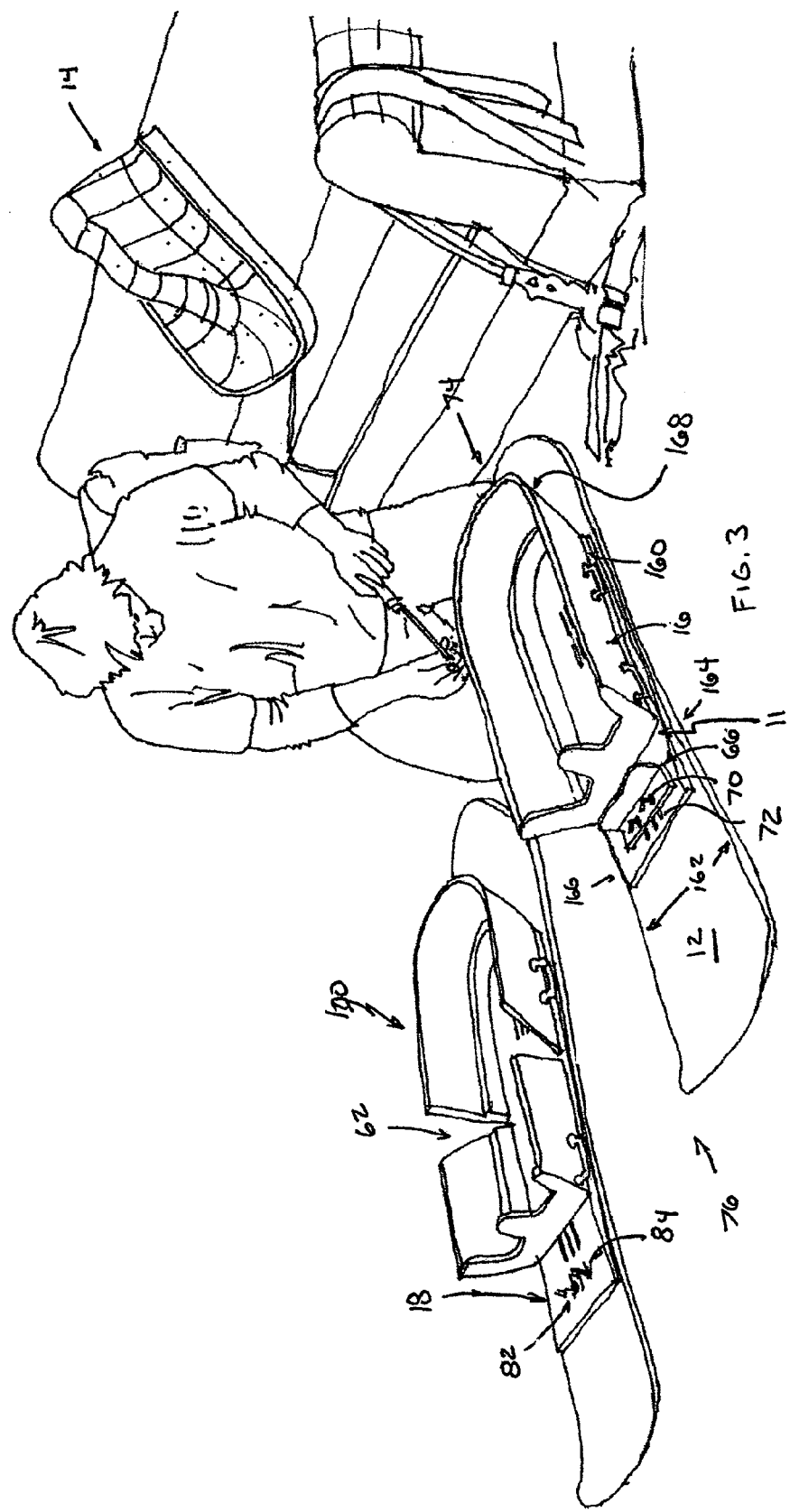

KNEELING/SLEDDING SNOW BOARD APPARATUS

CLAIM OF PRIORITY

This application claims the benefit of U.S. Provisional Patent Application Nos. 61/181,690 filed May 28, 2009 and 61/088,150 filed Aug. 12, 2008.

BACKGROUND OF THE INVENTION

Connecting ones self in a kneeling position to a snow board is the subject of at least two known patent applications. U.S. Published Patent Application No. 2007/0096411 shows a retraining device 14 which allows a rider be secured into a kneeling position on a gliding board 12 such as a snow board for use on snow. While linkage members 33 may be utilized to retain ones self to the retaining device 14 in a kneeling position, improvements over this basic construction are believed to be necessary. U.S. Published Patent Application No. 2006/0027982 shows another kneeling construction which does not rely on lap belts. Instead calf holders 84, 94 are used to retain an individual to the knee support 24 supported by a base.

While both of these designs allow a rider to navigate a slope supported principally by their knees in a kneeling position on a snow board, improvements over these earlier designs are believed to be desirable.

SUMMARY OF THE INVENTION

Accordingly, it is a principal object for at least some embodiments of the present invention to provide an improved knee board support system for allowing one to kneel atop a snow board.

It is another object of the present invention to provide an improved support system for a snow board allowing sledding or kneeling options for at least some embodiments.

It is another object of at least some embodiments of the present invention to provide an improved control system and support system for use with a snow board which can provide a rider with at least two riding options.

It is another object of at least some embodiments of the present invention to provide improved control when kneeling or sledding on a snow board.

It is another object of at least some embodiments of the present invention to provide for an improved configuration to allow one to kneel on a snow board while achieving increased performance from a snow board over prior art designs.

Accordingly, in accordance with the presently preferred embodiment of the present invention, a knee pad is provided preferably in a tray where the tray has upwardly extending and outwardly tapered sidewalls which extend from a narrow base upwardly and outwardly to then receive the legs of the shins of user thereon top providing greater leverage and control. The knee pad has a trough defined between sidewalls and a seat extension which can receive the legs of a rider. The tray may preferably be mounted with a slotted mounting system to allow for front-to-back positioning of the tray relative to the snow board which can be selected based on snow conditions or other factors. In fact, traditional snow board binding locations can be utilized with the slotted construction of the presently preferred embodiment. An optional foot press plate can be utilized for increased control which may also be adjustable relative to the tray. Additionally, an improved strap system can be employed such as including an integral lap belt with foot strap construction and/or vee straps which connect the front strap to the lap or rear belt while providing increased stability during turning.

BRIEF DESCRIPTION OF THE DRAWINGS

The particular features and advantages of the invention as well as other objects will become apparent from the following description taken in connection with the accompanying drawings in which:

FIG. 1 is a side elevational view of the presently preferred embodiment of the present invention;

FIG. 3 is a partially disassembled view of a structure shown in FIG. 1 of an optional foot press plate;

FIG. 6A is a rear plan view of an embodiment shown in FIG. 1;

FIG. 6B is the alternate embodiment of a press plate replacing the integrated foot strap of the preferred embodiment shown in FIG. 6A;

FIG. 6C is a side plan view of the press plate shown in FIG. 6B;

DETAILED DESCRIPTION OF THE DRAWINGS

Figure 2:
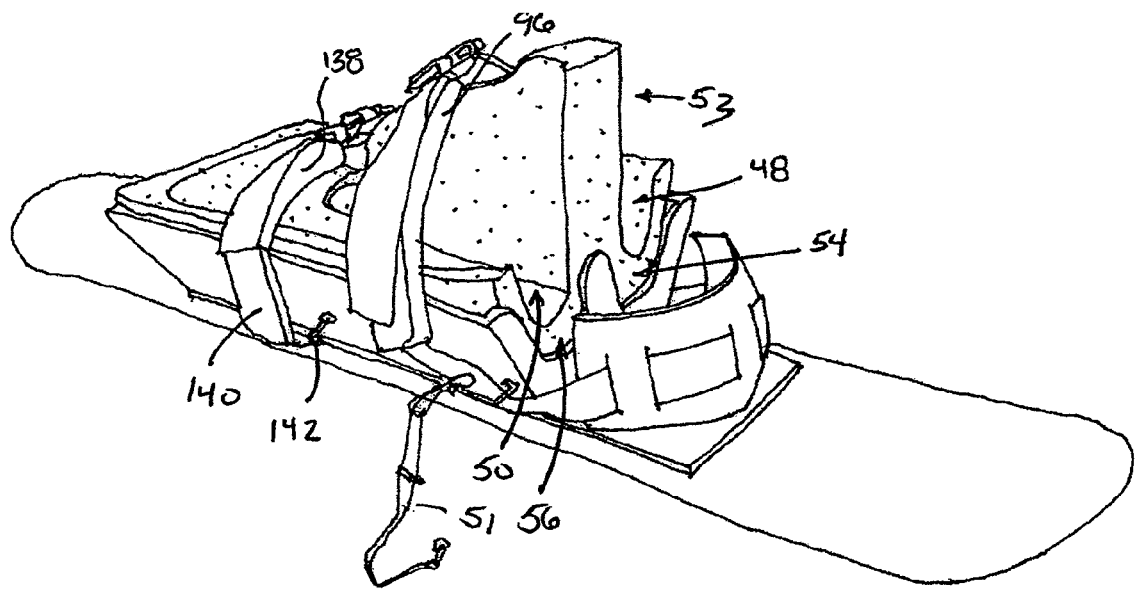
FIG. 2 is a rear elevational view of the design shown in FIG. 1.
Figure 4:
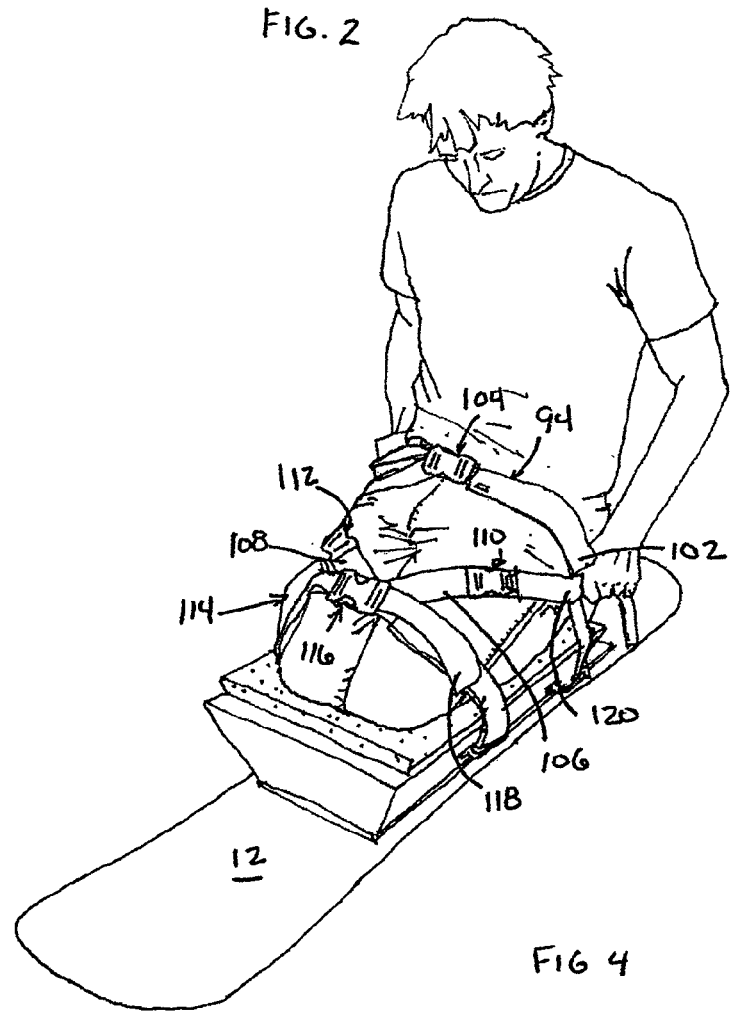
FIG. 4 is a front perspective view showing a rider connected to the design in a kneeling position.

FIGS. 1-9 show a gliding board apparatus 10 with a retention device 11 retaining a rider to a gliding board illustrated as a snow board 12. Knee pad 14 is shown inserted in sled tray 16. Sled tray 16 is preferably connected to snow board 12 with mounting device 18. Finally, strapping 20 preferably assists in keeping the rider on the board 12 when in use. All these components will be discussed in further detail below.

The gliding board illustrated snow board 12 is preferably any snow board currently available on the market. Other gliding boards such as but not limited to boards utilized with water sports and snow sports or other sports such as wake boards, surf boards, kayaks, canoes, knee boards, wake skates and the like may be modified to include the technology disclosed herein. Skis and other gliding surfaces may also take the form of glide boards illustrated as snow board 12 in the preferred embodiment.

Knee pad 14 is preferably provided as a removable insert relative to tray 16 so that it can be taken in and out of position relatively easy in the preferred embodiment. Sizes of knee pads 14 may vary based on the size of the user such as, but not limited to small/medium/large/extra large. In the preferred embodiment a single tray 16 may be utilized for the various size knee pads 14. In other embodiments various sized trays 16 may be provided.

The knee pad 14 may preferably be constructed from a foam based or other material. The density of the foam, if utilized, and performance characteristics of the knee pad 14 can vary based on the criteria of the rider such as for improving performance or comfort.

Seat extension 20 is illustrated as a contoured seat extension and may be useful to keep the rider in a forward position when in a kneeling position. Seat extension may also cooperate with the strapping 20 to assist in holding a rider 24 in a desired position and is believed in some embodiments to provide for better board control. Seat extension 22 can also assist in supporting the weight of a rider thereby potentially taking some of the weight off of a rider's ankles and other portions of the legs which will be described below.

Figure 5:
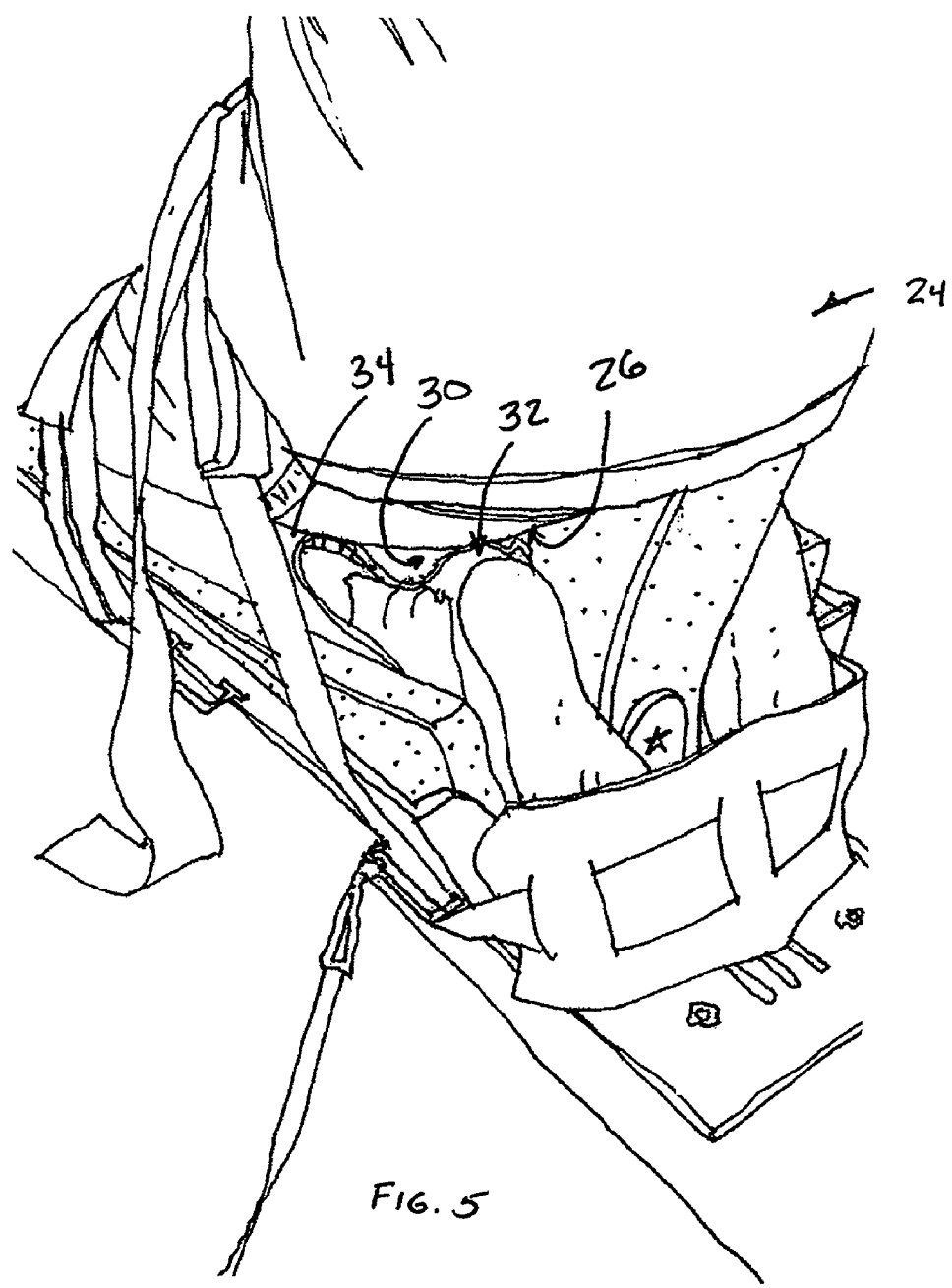
FIG. 5 is a rear perspective view showing the rider connected to the design.

FIG. 5 shows a rider 24 with his or her bottom 26 against an upper surface 28 thereby potentially providing a gap 30 between the rider's body 28 and ankle 32. However, in other embodiments, the bottom 26 of the rider 24 may contact ankle 32 and/or lower leg portion 34. Seat extension 22 of a presently preferred embodiment provides for a seat extension 22 terminating at terminal point 36 which is illustrated at a mid portion of the knee pad 14 rearwardly of a front 74 of the knee pad 14. In fact, the terminal portion 36 is located at an end of a trough 38 also defined by upwardly extending walls 40 which preferably extend up to an elevation towards an upper surface 42 of the tray 16 if not contained over the upper surface 42 with the tray 16 as can be seen in FIG. 5.

At least some portions of the rider's lower leg 34 may be located inside the trough 38 when in an in-use configuration thereby providing ability for the rider to extend force through his or her lower leg 34 through the side wall 44 through the tray wall 46 to therefore potentially assist in turning such as a hockey style slide stop and/or turning. Front wall 40 may cooperate with side walls 46 to preferably provide a U-shaped cross section extending from the side wall 46 to the front wall 40 to back to the other side wall 46 as can be more clearly seen in FIG. 2. The seat extension may assist in defining the trough 38 intermediate to the walls 46,40. Cutouts 48,50 can provide locations for the feet to extend out the rear 53 so that the side of the feet can contact the rear 53 of the tray 16 or other portion or be allowed to extend in free space for comfort. Trays 16 preferably may also be provided with cutouts 54,56 as well at the rear 53 thereof. As will be discussed below, the cutouts 48,50,54,56 may also be configured to receive the legs of a rider when in a sledding configuration or possibly at portions thereof.

Sides 31 of seat extension 22 are useful to grab when the seat and/or legs of a rider to assist in turning the board 12. The seat extension 22 preferably extends upwardly towards the rear 53 to uppermost elevation 33 as proceeding from taper point 36 rearwardly to the upper surface 28. It is observed that this increase in elevation may not be linear. The preferred embodiment initially proceeds upwardly and angularly in a somewhat contoured and curved fashion which may assist in providing comfort to a rider. Sides 64 of tray 16 may extend upwardly roughly about one to eight inches and most preferably about four to six inches from base 160. As can be seen in FIG. 2, leash 51 is useful and often acquired by many ski slopes to connect the apparatus 10 to the rider 24.

It should be noted in FIG. 1 that trough 38 is preferably unencumbered between the front wall 40 and the terminal portion 36 of the seat extension 22 which comprises at least a third and substantially about a half of the length L of the knee pads 14. The trough 38 can be a seating location for use in a sledding configuration which will be discussed in further detail below.

Tray 16 may be a unitary construction piece or may be provided in a split tray configuration such as having a front tray portion 58 and rear tray portion 60 with a side slot 62 therebetween as shown in phantom in FIG. 1 and in an attachment embodiment of FIG. 3 which may assist in allowing the board to flex. This feature may provide increased performance for various embodiments. A better view of a split tray embodiment is seen in FIG. 3 with a retention system 100 can be compared to retention system 11 having a continuous side such as side 64 shown in FIG. 3. A truck system could also be utilized in various embodiments which could provide for separation from the tray 16 and the board 12 thereby allowing the board 12 to flex. Trucks could be constructed such as a cantilevered pivoting truck system or a sliding truck system or other that is known by those of ordinary skill in the art. Side 64 may provide increased stiffness over those shown in the embodiment of retention system 100 provided with side slot 62. Solid side 64 has been tested for a tray 16 and has been found to provide increases stiffness for improved control at least in some embodiments.

Tray 16 is preferably rigidly constructed and may provide support for knee pad 14. A rigid construction has been found to facilitate turning capability such as by providing increased leverage when leaning into a turn as well as providing structure for the outer portion of the knee to contact thus forcing away from the turn in some embodiments. An upper portion of tray 16 is also preferably wider than the board 12 while a bottom portion of the tray 16 is preferably about the same width as the board 12 or preferably slightly narrower.

Foot press plate 66 is optional but is preferred in some embodiments and is shown in further detail in FIGS. 6B and 6C. Connector 68 can be disposed in slots 70 and/or 72 thereby potentially provide for a plurality of position options and selectable adjustment of the press plate 66 relative to the tray 16. This can allow some riders the option of choosing comfortable positions while providing increased stability and control for various operating conditions. As one can see from FIGS. 3, 6B and 6C, the press plate 66 can be moved toward the front 74,76 utilizing the connector 68 cooperating with the slots 70,72. The press plate 66 is illustrated as having a shoulder 78 connected at a right angle to base 80 but in other embodiments other configurations and angular relationships may be possible.

Mounting system 18 is illustrated as providing a plurality of slots 82 which can cooperate with a connector such as cam connectors, bolts, nuts, etc., and can extend through slots 82 into board 12 such as in the traditional snow boot binding connector tapered bores thereby allowing front to back 74,76 positioning of the tray 16 relative to the board 12. By providing a quick release style connectors 84 such as cam lock systems, available on the market, the operator can quickly adjust for different style operating conditions basically to shift away the rider relative to the front 74 and/or the rear 76 so that rider can positioned differently for different operating conditions such as being desired for the comfort and/or ability desired by the rider 24.

A contact surface 86 may be hydrophilous which can provide a grip such as a rubber grip on the boots or shoes of the rider. It is further observed that the press plate 66 can be positioned independently of the strapping system 20 as will be discussed in further detail below in this alternatively provided preferred embodiment.

In the presently preferred embodiment, foot strap 88 is employed having a hydrophilous pad or other pad 90 at least in some embodiments. The foot strap 88 of the presently preferred embodiment may be integrally connected by strap members 90 to lap belt 94. A predetermined length of the foot strap 88 lap belt 94 is selectable. Once again hydrophilous sleeve 96 or pad 96 may be useful in providing for a secure fit and an increased comfort and control for turning.

Strap 92 can connect the lap or rear belt 94 to the foot strap 88 as can be seen as the strap 92 passes through retainers 98. When rider 24 leans forward, the lap or rear belt 94 is pulled towards the front 74 due to the integral nature of the foot strap 88 and lap belt 94. Foot strap 88 is then also pulled towards front 74 toward the rear 52 of the tray 16 in this embodiment. The rider is believed to be provided with increased control as would be understood by those of ordinary skill in the art.

Strap presses through retainer 98 (with opposite retainer obscured from view). Retainers 98 may be secured to the sides of the tray 16 in the preferred embodiment. In order to tension the lap belt 92 leaning forward can provide tension to the foot strap 88. In order to decrease the length of the strap 92, the free end 102 can be pulled relative to buckle 104 therefore shortening a total length of the lap belt 94 and foot strap 88 combination. Releasing buckle 104 can release the strap 92. Furthermore, the free end 102 can be adjusted towards the buckle 104 as would be understood by one of ordinary skill in the art thereby lengthening the length of at least one of the lap or rear belt 94 and the foot strap 88.

Vee straps 106,108 with buckles 110,112 are useful to connect the lap or rear belt 94 to the front belt 114, the front belt 114 also has a buckle 116 for an adjustability provided by strap end 118 which can be pulled for increased tightness. Similarly, vee straps 106,108 are preferably provided with free ends such as free end 120 which can be pulled relative to the buckle 110 to shorten the length of the strap 106.

As one can see from FIG. 1, the vee straps 106,108 are connected as illustrated with slides 122,124 for connectors connecting to lap belt 94 as well as by connectors 126,128 which may also be slides connecting the vee straps 106,108 to the front belt 114. The connectors 122,124,126,128 are shown in opposing sides of the belt as referenced to the buckles 104,116 if buckles are utilized. The vee straps 106, 108 connect closer to a center 111 of front belt 114 than a center 113 of rear belt 94. Other embodiments may be differently provided. In fact, vee straps 106,108 are not required for all embodiments. However, vee straps 106,108 construction is found to be an attractive option to provide increased control of the maneuverability for at least some embodiments. The vee straps system 106,108 has been found to resist the knee strap or front strap 114 from sliding forward.

Figure 7:
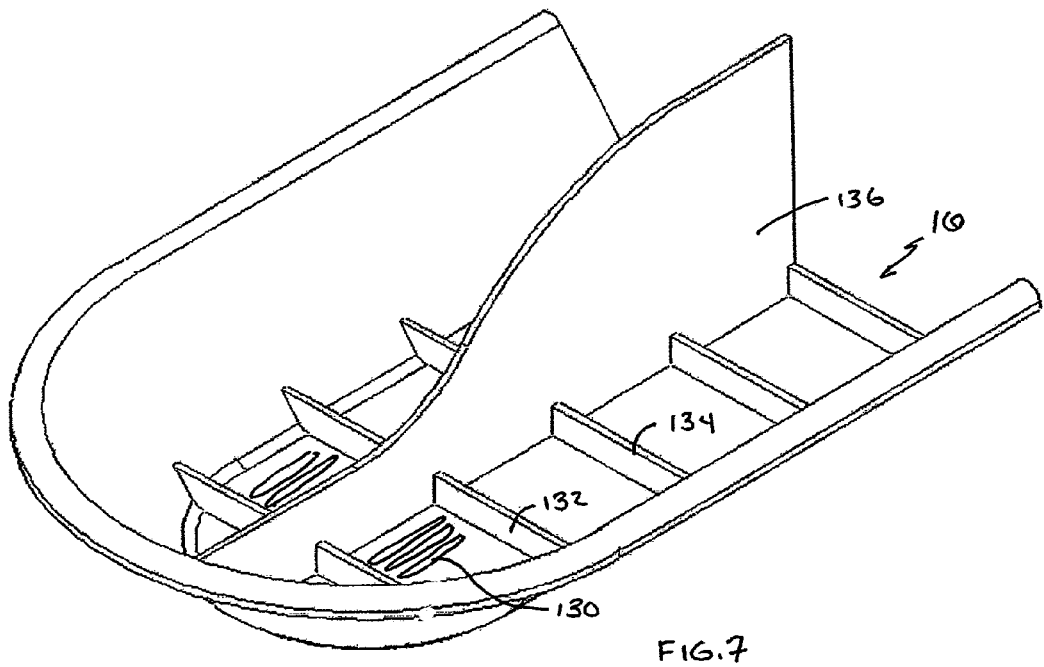
FIG. 7 is a top perspective view of a tray of a preferred embodiment.

FIG. 7 shows a tray 16 removed from the mounting system 18 in the preferred embodiment. Alternative embodiments of the tray 16 and mounting system 18 may be integrally or otherwise connected. The tray 16 is preferably provided with a plurality of slots 130 to at least assist in cooperating with the bindings of a traditional snow board as utilized as board 12.

Tray 16 may be provided with a plurality of ridges 132,134, etc. which can assist in retaining the knee pad 14 in a desired position. Also, central fin 136 may be useful to provide additional underlying support for the seat extension 22. The central fin 136 is also useful for the rider 24 to grab through seat extension 22 with his lower legs or ankles to assist in twisting and turning the board 12 (whether in the sledding or kneeling configuration).

FIG. 2 is useful in that it also shows strap pads 138 as well as 96 which can provide superior grip and hold in snow and wet conditions and preferably allow a rider 24 to maintain a good grip even when wet. Hydrophilous materials may be utilized at lest in some embodiments. Other constructions may have differently formed pads, if any, apart from the strapping. The front strap 114 can be a continuous strap 140 passing through tray mounts 142 on both sides and continuously underneath buckle 128. Ends such as free end 118 can come off the top near buckle 128. Other embodiments may have other constructions.

Figure 8:
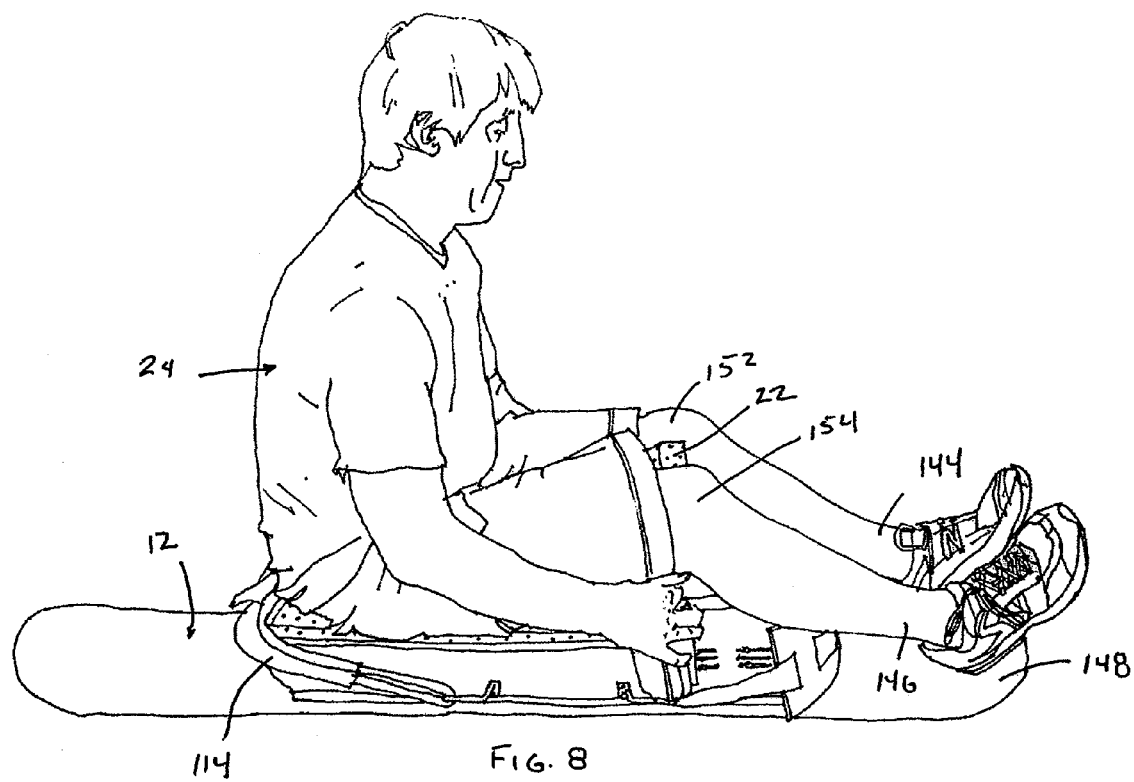
FIG. 8 is a side perspective view of the system in FIG. 1 with a rider using a sledding configuration.

FIG. 8 shows the system 10 of FIG. 1 with a rider in alternative position, namely, sitting and sledding configuration. The rider's hands could grab the tray 16 as illustrated, knee pad 14, or rear belt 94. The rider's feet 144,146 could either be unrestrained such as on or by upper surface 148 of board 12 such as could be extended into the snow for braking. The front belt 114 may or may not be utilized such as a lap belt in this embodiment and foot strap 88 may be grabbed by the feet 144,146 for use in improved steering such as at the pad 150 which could be hydrophilous.

Figure 9:
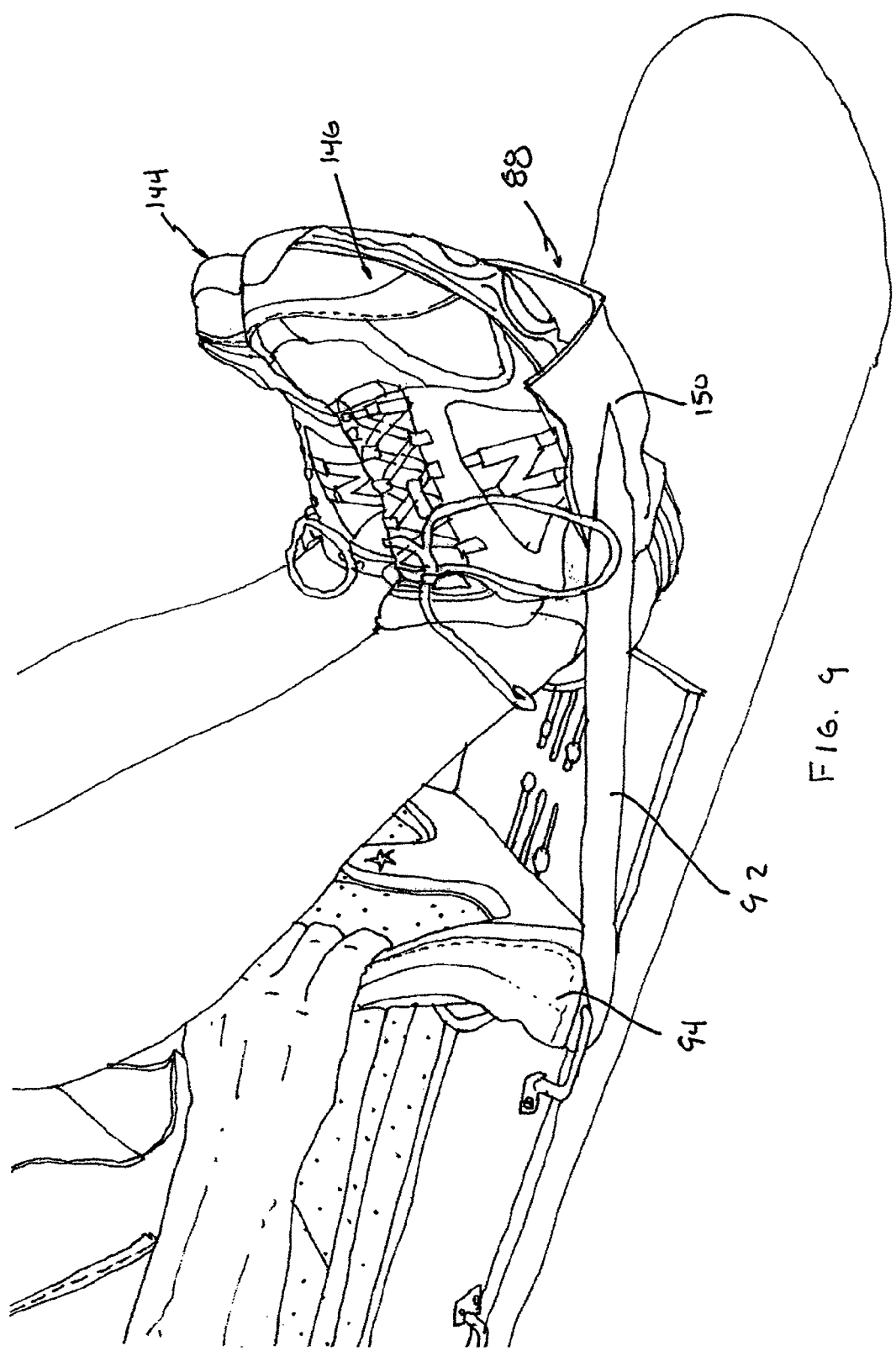
FIG. 9 shows the system of FIG. 8 with the rider's legs out in front for braking.

It is observed that the seat extension 22 may extend between the knees 152,154 may provide for increased control. The front strap 114 can be tightened towards the front of the tray 16 as illustrated in FIG. 8 or otherwise. Instead of grabbing the front of the tray 16, the lap strap 92 may be utilized as a handle as is shown in FIG. 9. Of course, the foot strap 80 may be significantly longer for use in a sledding configuration than when utilized in a kneeling configuration. This may be taken into account by the lap strap 92 being shorter and/or by lengthening the strap material 92.

As can be seen with a reference to FIGS. 1 and 3, side 64 of tray 16 is preferably outwardly tapered. The base 160 of tray 16 preferably provides a smaller width 162 at the board 12 and then tapers upwardly and outwardly such as from about nine inches upwardly and outwardly to about fifteen inches which may assist in better accommodating the legs of a user when in use. A narrowness at the base 160 has been found for increased leverage without dragging into the snow such as powder for some embodiments when not extending beyond the edges 164,166 of the board 12 at the base 160. Furthermore, rounded front 168 as well as tapering from a smaller or larger cross sectional area is taken parallel to board 12 has also been found to increase comfort particularly in powder to direct snow such as powder away from the tray 16.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A recreational gliding board system comprising:
   a gliding board having mounting locations on an upper surface thereof;
   a kneepad atop the gliding board, said kneepad having a seat extension extending cantileveredly upwardly from a central portion of the kneepad at a rear of the kneepad and terminating rearwardly of a front of the kneepad, said seat extension having an upper elevation;
   a mounting platform, said platform connected to the gliding board; and
   wherein the mounting platform is connected to the upper surface at the mounting locations.

2. The recreational gliding board system of claim 1 wherein the seat extension has an upper surface which contacts a bottom of the rider when in use.

3. The recreational gliding board system of claim 1 wherein the kneepad has a trough between a front wall and the seat extension said trough unobstructed.

4. The recreational gliding board system of claim 3 wherein the trough extends intermediate side walls of the knee pad and the extension provides at least a U-shape about the seat extension.

5. The recreational gliding board system of claim 1 further comprising cutouts in the kneepad on opposing sides of the seat extension.

6. The recreational gliding board system of claim 1 further comprising a rigid tray with the kneepad atop the tray and cutouts are provided in the tray on opposing sides of the seat extension in a rear side of the tray.

7. The recreational gliding board system of claim 1 further comprising a tray having an upper surface tapering to a base, and said base has a width no greater than a width of the board where attached.

8. The recreational gliding board system of claim 1 further comprising a rear belt extending above the kneepad which is integrally connected to a foot strap extending behind the kneepad.

9. The recreational gliding board system of claim 1 further comprising vee straps, front strap and rear belt, said vee straps extending from the front belt to knees the rear belt with said vee straps connected closer to a center of the front belt than where connected to the lap belt.

10. The recreational gliding board system of claim 1 further comprising slots in mounting system, said slots cooperating with bores in the board and fasteners connecting the mounting system to the board while providing for adjustment of position of the mounting system relative to the board.

* * * * *